United States Patent Office 3,420,863
Patented Jan. 7, 1969

1

3,420,863
β-[α'-(1''-1'''-TRIMETHYLENEFERROCENYL)]-
1,1'-TRIMETHYLENEFERROCENES
Richard A. Schnettler, Milwaukee, and John T. Suh,
Mequon, Wis., assignors to Colgate-Palmolive
Company, New York, N.Y., a corporation of
Delaware
No Drawing. Filed Apr. 11, 1966, Ser. No. 541,500
U.S. Cl. 260—439                         7 Claims
Int. Cl. C07f 15/02

ABSTRACT OF THE DISCLOSURE

The compounds are dimers of trimethyleneferrocene useful as petroleum additives and hematinic agents. Among the compounds disclosed are β-[α'-(1'',1'''-trimethyleneferrocenyl)]-1,1'-trimethyleneferrocene and α-hydroxy - β - [α'(α' - hydroxy-1'',1'''-trimethyleneferrocenyl)]-1,1'-trimethyleneferrocene.

This application relates to novel ferrocene dimers, processes of preparing them and uses for such compounds. Ferrocene is the commonly accepted name for dicyclopentadienyliron or biscyclopentadienyliron.

The novel compounds of the present invention may be represented by the following formula:

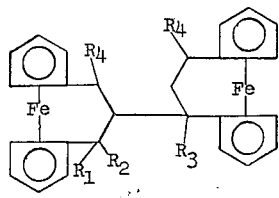

wherein $R_1$ is oxygen, hydroxy, hydrogen, a lower alkyl having 1 to 4 carbon atoms such as methyl, ethyl, isopropyl and butyl; aryl, such as phenyl or a nuclear substituted phenyl such as a chlorophenyl; aralkyl, such as benzyl, phenethyl, phenylisopropyl and diphenylmethyl; $R_2$ is hydrogen when $R_1$ is not oxygen; $R_3$ is hydroxy or hydrogen; $R_4$ is hydrogen, a lower alkyl having 1 to 4 carbon atoms such as methyl, ethyl, isopropyl and butyl; aryl, such as phenyl or a nuclear substituted phenyl such as chlorophenyl; aralkyl, such as benzyl, phenethyl, phenylisopropyl and diphenylmethyl.

The novel compounds of the present invention may be conveniently prepared by a unique aldol condensation which employs an aluminum oxide column as a catalyst.

The process of preparing the claimed compounds is illustrated by the following diagrams which show the preparation of the compounds in which $R_1$ is oxygen, hydroxy or hydrogen, $R_2$ is hydrogen when $R_1$ is not oxygen, $R_3$ is hydroxyl or hydrogen, and $R_4$ is as previously described.

2

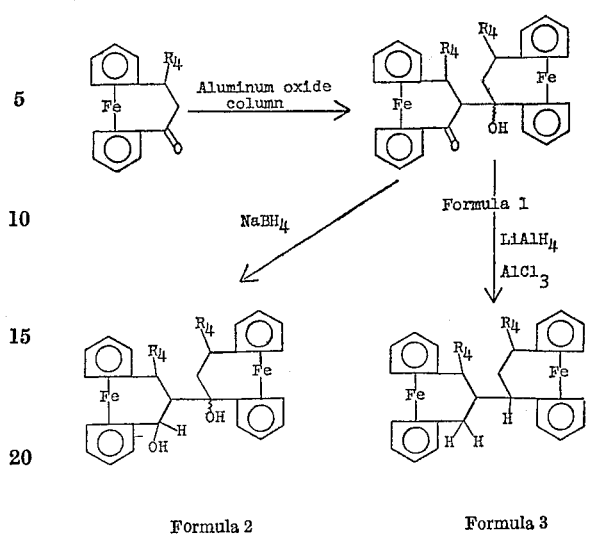

Formula 2                    Formula 3

The starting material employed in the above described process when $R_4$ is hydrogen is α-keto-1,1'-trimethyleneferrocene, a known compound. In the preferred practice of the process of the invention, the ketone is placed on an aluminum oxide column and eluted with petroleum ether (B.P. 60–75°) until the movement of the orange band which comprises the ketone stops. The column is then allowed to stand at room temperature for 24 hours (temperatures from 0–35° and higher can be used, and reaction times of 10 minutes to 7 days are possible). The unreacted ketone is then removed by elution with a mixture comprised of 1.5 parts of ether and 3.5 parts of petroleum ether. Elution is continued with the same solvent to provide a 1:1 mixture of erythro- and threo-α-keto-β-[α'(α'-hydroxy-1'', 1'''-trimethyleneferrocenyl)]-1,1'-trimethyleneferrocene. The resulting compounds may then be reduced with sodium borohydride or lithium aluminum hydride-aluminum chloride, under standard reaction conditions, to yield the compounds of Formula 2 or 3, respectively.

Those compounds in which $R_4$ is other than hydrogen may be prepared by allowing α'-substituted ketones such as α-keto - α' - methyl-1,1'-trimethyleneferrocene to condense on alumina to form dimers such as α-keto-β-[α'(α'-hydroxy - α' - methyl-1'', 1'''-trimethyleneferrocenyl)]-γ-methyl-1,1'-trimethyleneferrocene. The α'-substituent or $R_4$ substituent may be a lower alkyl such as methyl, ethyl, isopropyl or butyl, an aryl such as phenyl or a nuclear substituted phenyl such as chlorophenyl, or an aralkyl such as benzyl, phenethyl, phenylisopropyl and diphenylmethyl. The α'-substituted ketones which may be employed as starting materials may be prepared as described by J. W. Huffman and R. L. Asbury in J. Org. Chem., 30, 3941 (1965).

Representative of the compounds that can be prepared by the practice of the present invention are the following:

α-keto-β-[α'(α'-hydroxy-1″, 1‴-trimethylene-ferrocenyl)]-1,1'-trimethyleneferrocene,
α-hydroxy-β-[α'(α'-hydroxy-1″, 1‴-trimethylene-ferrocenyl)]-1,1'-trimethyleneferrocene,
β-[α'-(1″,1‴-trimethyleneferrocenyl)]-1,1'-trimethyleneferrocene,
α-keto-β-[α'(α'-hydroxy-γ-$R_4$-1″,1‴-trimethylene-ferrocenyl)]-γ-$R_4$-1,1'-trimethyleneferrocene, and
α-keto-β-α'(α'-hydroxy-γ'-methyl-1″,1‴-trimethylene-ferrocenyl)]-γ-methyl-1,1'-trimethyleneferrocene.

The compounds of the present invention show promise as highly stable organo-iron sources for use in a variety of chemical procedures, e.g., polymerization reactions and the like. In addition, they can be used as petroleum additives, such as anti-knock agents, and pharmaceuticals, such as hematinics, for the treatment of iron deficiencies in animals.

The following examples illustrate the preparation of the novel compounds:

Example 1.—α-Keto-β-[α'(α'-hydroxy-1″,1‴-trimethyleneferrocenyl)]-1,1'-trimethyleneferrocene To an alumina column (500 g.) is added 5.4 g. α-keto-1,1'-trimethyleneferrocene and the column is eluted with petroleum ether (B.P. 60–75°) until the orange band ceases to move. The column is allowed to stand for 24 hours after which it is eluted with a solvent mixture composed of 1.5 parts ether and 3.5 parts petroleum ether. The first fractions contain 3.6 g. of the starting ketone and the latter fractions contain 1.8 g. of a mixture of the two isomeric forms of the desired compound. To a silica gel column (200 g.) is added 1.8 g. of the mixture. Elution with 8 parts chloroform to 1 part benzene effects a separation. The first fractions obtained from the column were a pure isomer, M.P. 191–192°. The latter fractions contained another pure isomer, M.P. 210–11°. Molecular weight calcd.: 480.15. Found: 478.

Analysis.—Calcd. for $C_{26}H_{24}Fe_2O_2$: C, 65.03; H, 5.03; Fe, 23.24. Found: C, 64.84; H, 5.14; Fe, 23.17.

Example 2.—α-Hydroxy-β-[α'(α'-hydroxy-1″,1‴-trimethyleneferrocenyl)]-1,1'-trimethyleneferrocene In 800 ml. p-dioxane is dissolved 200 mg. (0.0004 mole) of the ketol of Example 1 (M.P. 191–192° C.) and 2.0 g. sodium borohydride. The mixture is stirred at room temperature for 5 hours and then the reaction stopped by the addition of 25 ml. acetone. The solvent is removed and the residue dissolved in ethyl acetate, washed with water and dried. Removal of the solvent affords a yellow solid which is recrystallized from ethyl acetate to give α-hydroxy - β - [α'(α' - hydroxy-1″,1‴-trimethyleneferrocenyl)]-1,1'-trimethyleneferrocene in the form of a fluffy yellow solid, M.P. 251–54°.

Analysis.—Calcd. for $C_{26}H_{26}Fe_2O_2$: C, 64.55; H, 5.43; Fe, 23.16. Found: C, 64.85; H, 5.64; Fe, 22.55.

Example 3.—α-Hydroxy-β-[α'(α'-hydroxy-1″,1‴-trimethyleneferrocenyl)]-1,1'-trimethyleneferrocene The process of Example 2 is repeated using the isomeric form of the ketol having a melting point of 210–211°. The isomer obtained is a yellow fluffy solid, M.P. 220–225°.

Analysis.—Calcd. for $C_{26}H_{26}Fe_2O_2$: C, 64.55; H, 5.43; Fe, 23.16. Found: C, 64.93; H, 5.82; Fe, 22.88.

Example 4.—β-[α'-(1″,1‴-Trimethyleneferrocenyl)]-1,1'-trimethyleneferrocene

To 1,000 ml. dry ether is added 0.90 g. (0.00187 mole) of the ketols of Example 1 and 4.0 g. (0.030 mole) aluminum chloride and 0.60 g. (0.0158 mole) lithium aluminum hydride. The mixture is stirred at room temperature for 3 hours after which it is cooled and moist ether is added until the excess lithium aluminum hydride is destroyed. Dilute sulfuric acid (200 ml.) is added to the reaction mixture and the aqueous layer separated from the organic layer. The organic layer is washed with water and dried over sodium sulfate. Removal of the solvent affords a brown solid which is chromatographed over silica gel to give a yellow solid. Crystallization from chloroform-n-hexane gave β-[α'-(1″,1‴-trimethyleneferrocenyl)]-1,1'-trimethyleneferrocene in the form of yellow crystals, M.P. 220–250°.

Anaylsis.—Calcd. for $C_{26}H_{26}Fe_2$: C, 69.37; H, 5.82. Found: C, 69.11; H, 5.73.

We claim:
1. A compound of the formula

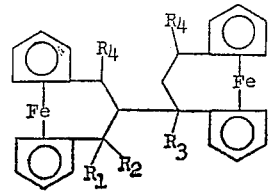

wherein $R_1$ is oxygen, hydroxy, hydrogen, a lower alkyl having 1 to 4 carbon atoms, aryl or aralkyl; $R_2$ is hydrogen only when $R_1$ is not oxygen; $R_3$ is hydrogen or hydroxy; and $R_4$ is hydrogen, lower alkyl, aryl or aralkyl.

2. A compound of claim 1 in which $R_1$ is oxygen, $R_3$ is hydroxyl, and $R_4$ is hydrogen or lower alkyl.

3. A compound of claim 1 in which $R_1$ is hydroxyl, $R_2$ is hydrogen, $R_3$ is hydroxyl, and $R_4$ is hydrogen.

4. A compound of claim 1 in which $R_1$, $R_2$, $R_3$ and $R_4$ are hydrogen.

5. A compound of claim 1 in which $R_1$ is hydroxyl, $R_2$ is hydrogen, $R_3$ is hydroxyl, and $R_4$ is hydrogen or lower alkyl.

6. A compound of claim 1 in which $R_1$ is hydrogen or hydroxyl, $R_3$ is hydrogen or hydroxyl, and $R_4$ is hydrogen, lower alkyl, phenyl, nuclear substituted phenyl, benzyl phenethyl, phenylisopropyl or diphenylmethyl.

7. The process of preparing a compound of claim 1 in which $R_1$ is oxygen and $R_3$ is hydroxyl, which comprises placing a desired α-keto-1,1'-trimethyleneferrocene in contact with aluminum oxide and allowing said mixture to react to form the corresponding α-keto-β-[α'(α'-hydroxy - 1″ - 1‴ - trimethyleneferrocenyl)]-1,1'-trimethyleneferrocene.

References Cited

RAINER et al.: A.C.S., Abstract of Papers, 131st meeting (1957), p. 51–0.
METAL HYDRIDES, Inc., Bulletin 502H (1958), pp. 4–5.

TOBIAS E. LEVOW, *Primary Examiner.*

A. P. DEMERS, *Assistant Examiner.*

U.S. Cl. X.R.

252—386, 431; 260—999